United States Patent [19]
Clabburn et al.

[11] 3,982,564
[45] Sept. 28, 1976

[54] HEAT RECOVERABLE ARTICLE

[75] Inventors: Robin James T. Clabburn, Highworth, England; Maurice Raymond Pettit, Pellenberg; Guido De Keermaecker, Leuven, both of Belgium

[73] Assignee: Raychem Corporation, Menlo Park, Calif.

[22] Filed: Dec. 10, 1973

[21] Appl. No.: 423,191

[52] U.S. Cl. .............................. 138/110; 138/99; 138/178; 285/45; 285/293; 428/132
[51] Int. Cl.² ................. F16L 55/16; F16L 57/00
[58] Field of Search ............ 285/156, 293, DIG. 16, 285/DIG. 10, 45; 138/99, 110, 145, 161, DIG. 3; 161/109, 110, 116; 428/65, 132.

[56] References Cited
UNITED STATES PATENTS

| | | | |
|---|---|---|---|
| 2,470,499 | 5/1949 | Lapp | 285/45 |
| 2,724,672 | 11/1955 | Rubin | 285/DIG. 10 |
| 3,243,211 | 3/1966 | Wetmore | 285/DIG. 10 |
| 3,276,929 | 10/1966 | Ferch | 285/DIG. 10 |
| 3,297,819 | 1/1967 | Wetmore | 285/45 X |
| 3,455,336 | 7/1969 | Ellis | 138/158 X |
| 3,495,629 | 2/1970 | Botsolas et al. | 138/149 |
| 3,539,411 | 11/1970 | Heslop et al. | 285/DIG. 10 X |
| 3,711,633 | 1/1973 | Ghirardi et al. | 285/156 X |
| 3,724,491 | 4/1973 | Knudsen et al. | 138/149 X |
| 3,770,556 | 11/1973 | Evans et al. | 138/99 X |

Primary Examiner—Harry N. Haroian
Assistant Examiner—James E. Bryant, III
Attorney, Agent, or Firm—Lyon & Lyon

[57] ABSTRACT

A heat recoverable closure article and a method for covering a conduit junction having at least three arms. The article comprises a radially heat-shrinkable tubular member, or a member in sheet form having its opposite edge regions held together to form the tubular member. The member includes a heat-shrinkable aperture with a surrounding wall, the wall being such that, on heating, its height and periphery are reduced.

7 Claims, 4 Drawing Figures

HEAT RECOVERABLE ARTICLE

BACKGROUND OF THE INVENTION

This invention relates to heat-recoverable articles. More specifically, this invention relates to heat-recoverable articles suitable for covering conduits at the junctions thereof.

In the past, generally tubular heat-shrinkable articles for covering pipes, cables and the like, were used to achieve mechanical protection and electrical insulation. Examples of these articles are disclosed in U.S. Pat. No. 2,027,962 to Currie and U.S. Pat. No. 3,297,819 to Wetmore, the disclosures of which are incorporated herein by reference. These articles were designed primarily for wrapping around a single pipe or a butt-junction between two pipes. In U.S. Pat. No. 3,455,336 to Ellis, the disclosure of which is also incorporated herein by reference, there is disclosed a heat-shrinkable sleeve which can be wrapped around an article or two butt-joined articles, suitable for use, for example, when no free end of the pipe or pipes is available.

Although some prior art closure members may be used for covering a conduit junction having at least three arms, there remains a need for heat-recoverable articles suitable for enclosing a conduit junction involving three or more arms in a straight-forward, and economic manner. Examples of junctions involving three or more arms are T and Y junctions, and positions in a single conduit where a valve, meter or other device is attached to and protrudes from the conduit.

SUMMARY OF THE INVENTION

It is an object of this invention to provide a heat-recoverable article for covering a conduit junction having at least three arms.

It is also an object of this invention to provide a method for covering a conduit junction having at least three arms, with a heat-recoverable article.

It is a further object of this invention to provide a relatively inexpensive and straight-forward method and article for covering a conduit junction, having at least three arms, with a heat-recoverable article.

BRIEF DESCRIPTION OF THE DRAWINGS

The invention both as to its organization and principles of operation together with further objects and advantages thereof may better be understood by referring to the following detailed description of embodiments of the invention when taken in conjunction with the accompanying drawings in which.

DESCRIPTION OF A PREFERRED EMBODIMENT

Figure 1:
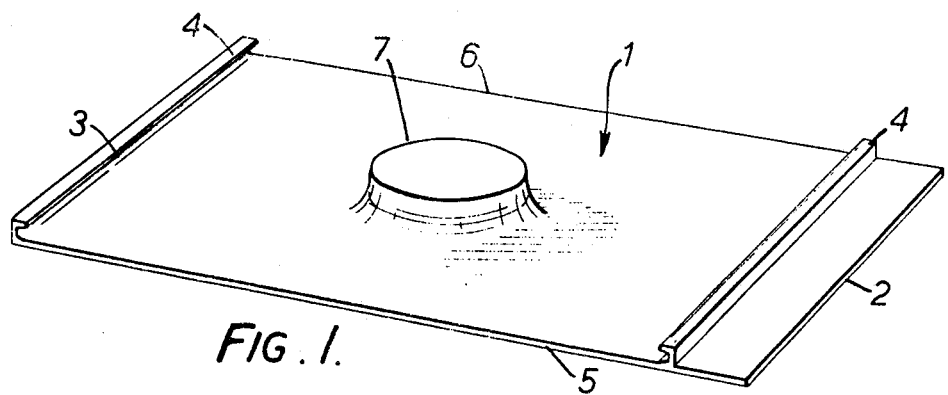
FIG. 1 illustrates a perspective view of a sheet having a single orifice, before application to a pipe junction, in accordance with this invention.

The present invention provides a heat-recoverable article adapted to cover a conduit junction having at least three arms. The article comprises a radially heat-shrinkable tubular member, or a member in sheet form, of which opposing edge regions can be brought and held together to form the tubular member. The member includes a heat-shrinkable aperture with a surrounding wall, preferably outwardly extending from the member. The wall, on heating, has its height and periphery reduced. The article may be manufactured with the wall aperture formed either before or after the member is made heat-recoverable.

The invention accordingly, also provides a process for the manufacture of such a heat-recoverable article. This process comprises forming an aperture in the heat-shrinkable member and passing a mandrel of cross-section greater than that of the aperture, through the aperture. The aperture is thus enlarged and the material surrounding the aperture is formed into a peripheral wall extending from the member. The process may be carried out while the member is below, at, or above its recovery temperature and restrained from recovery, for example, by clamping or pressure, in such a manner that the mandrel may be inserted. If the member is at or above the recovery temperature, the member is cooled with the mandrel restraining recovery of the area around the aperture.

Alternatively, a sheet material, which is capable of being rendered recoverable, may be subjected to a vacuum forming to have, for example, a conical protuberance. The sheet is expanded to form the heat-shrinkable member and the top of the cone is removed to form the aperture.

The invention also provides a method of enclosing a conduit junction which comprises applying the article of the invention to the parts of the conduit to be enclosed (where necessary, bringing and holding together opposed edge regions of a member in sheet form to form the tubular member about one or more of the conduits) and heating to cause recovery of the article.

It will be appreciated that the invention is applicable to covering conduit junctions having more than three arms, for example, cross pieces or double T's. Further, the arms need not be at right angles, but may be branches at obtuse angles or Y pieces. Also, the diameters of the various conduits need not be identical.

In an embodiment of the invention, a heat-recoverable article, adapted to be wrapped around a conduit junction having at least three arms, comprises a member in sheet form, capable of being formed into a tubular, radially shrinkable member. One of a pair of opposed edge regions is adapted to be brought and attached to a region on a first face of the tubular member formable therefrom. The sheet includes at least a pair of heat-shrinkable apertures each having a peripheral wall extending upwardly from the first face. The walls are such that their peripheries and heights are reduced on heating whereby the article may be wrapped around a conduit junction such that both apertures surround one conduit and form an arm of the junction. The apertures lie on a line transverse to the opposed edge regions. The article according to this embodiment may be manufactured in a manner corresponding to that described for the first mentioned article.

The material from which the heat-recoverable articles are made is any material capable of being rendered heat-recoverable. As examples of suitable polymers, there may be mentioned: crystalline polymers, for example, polyethylene; copolymers of ethylene with other ethylenically unsaturated monomers, for example, ethylene/vinyl acetate, ethylene/ethyl acrylate copolymers; ionomers, for example, a "Surlyn" (Trademark of E. I. Du Pont de Nemours & Co.) polyvinyl chloride, polyvinylidene fluoride, polytetrafluoroethylene or Viton. These materials are preferably cross-linked. Further, there may be used materials having elastomeric properties, for example, cross-linked thermoplastic polyurethanes, nitrile rubbers, ethylene/propylene copolymers and fluoroelastomers, modified where necessary to enable them to be made heat-recoverable. The polymer may contain any of the usual additives, for example, fillers, pigments, antioxidants, flame retardants and, if the material is cross-linked, suitable polyfunctional monomers. The material may be cross-linked by chemical means or by radiation, preferably high energy radiation.

Preferably, the heat-recoverable article has, on the surface to be contacted with the article to be covered, a layer of a sealant, mastic, or heat-melt adhesive, depending on the particular use for which the heat-recoverable article and the article to be covered are intended. Alternatively, the polymer of which the heat-recoverable article is formed may have adhesive properties.

Referring now to the drawings, and more especially to FIG. 1, a sheet, indicated generally by the reference numeral 1, comprises opposite edge regions 2 and 3, each having a ridge or protuberance 4. Each ridge or protuberance 4 may be of the type described and illustrated in more detail in previously mentioned U.S. Pat. No. 3,455,336. The sheet 1 has been expanded, in a manner known in the art, so that, on heating, the edge regions 2 and 3 become closer, without a substantial change in the width of the sheet, i.e. the distance between the remaining edges 5 and 6.

An aperture surrounded by a circular upstanding wall 7, is formed in the following manner. The sheet 1, having the property of heat-shrinkability between the edge regions 2 and 3 already imparted to it, is clamped or otherwise restrained to prevent shrinkage on heating. The clamp or other restraining means also allows access to the region in which the wall 7 is to be formed. A circular hole centered at the desired position at the center of the wall 7, and having a diameter less than that of the conduit to be covered, is formed, for example, by a tank cutter in the sheet 1. The clamped sheet 1 is then heated to a temperature at which the sheet would recover, if unrestrained, and a rounded-nosed cylindrical mandrel, having a diameter substantially equal to that of the desired wall 7, is forced against the underside of the sheet 1 and through the sheet 1. With the mandrel still in position, the sheet is cooled to below its recovery temperature thereby giving the shape as shown in FIG. 1.

Figure 2:
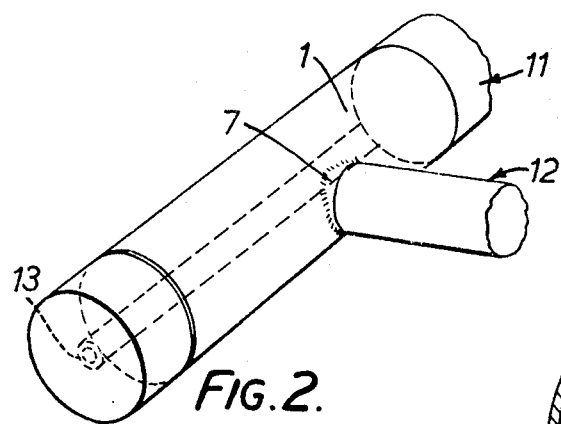
FIG. 2 illustrates a perspective view of the sheet of FIG. 1 after application to the pipe junction, in accordance with this invention.

Referring now more especially to FIG. 2, the sheet 1 is shown in a recovered state around a T junction and between two conduits 11 and 12. The sheet 1 has been applied to the junction by passing the conduit 12 (the upright of the T) through a hole formed by the wall 7 and wrapping the sheet around conduit 11 (the crossbar of the T). The edge 2 is positioned under the edge 3 so that the ridges 4 are in abutting relation and a channel 13 is slid along the rail formed by the abutting ridges 4. The cross-section of the rail and channel, which are described more fully in the previously mentioned U.S. Pat. No. 3,455,336, are shaped to cooperate to maintain the ridges 4 in abutting relationship during the recovery of the sheet. The sheet 1 is then heated to cause it to contract, and the diameter of the wall 7 is reduced to fit tightly around the conduit 12.

Figure 3:
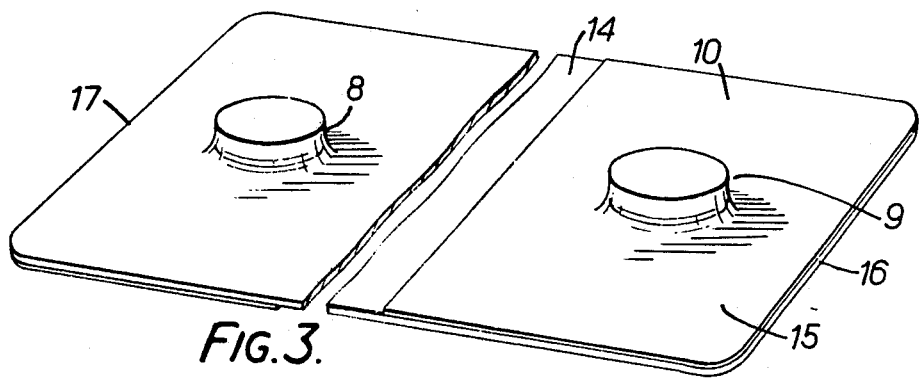
FIG. 3 illustrates a perspective view of a sheet having a pair of orifices, before application to a pipe junction, in accordance with this invention.

Referring now more especially to FIG. 3, there is shown an article constructed in accordance with an embodiment of the invention. In this embodiment, two circular walls 8 and 9 are formed in a sheet, indicated generally by the reference numeral 10, by means substantially as described with reference to sheet 1. The sheet 10 may have ridges 4, in a manner akin to that of the sheet 1, or it may be provided on its surfaces, in appropriate regions, with a contact adhesive. For example, there may be provided on the surface 14, from which the walls 8 and 9 project, an area 15 of contact adhesive which surrounds the wall 9 and extends to the edge 16 nearer to the wall 9. Correspondingly, there may be provided on the opposite face a corresponding area, which extends to the edge 17 opposite the edge 16.

Figure 4:
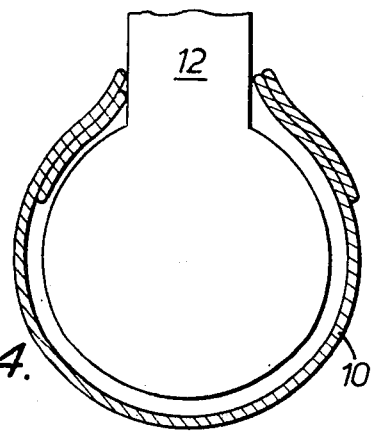
FIG. 4 illustrates a cross-sectional view of the sheet of FIG. 3 after application to a pipe junction, in accordance with this invention.

Referring now more especially to FIG. 4, a T junction is shown to be surrounded by the sheet 10. Both walls 8 and 9 of sheet 10 pass over and surround the conduit 12. The regions adjacent to the edges 16 and 17 overlap, such that the surfaces, having contact adhesive applied thereto, are in contact. On heating to cause recovery, the diameter of the wrap around sheet 10 thus formed is reduced, as is the diameter of the apertures surrounded by the walls 8 and 9. This forms a tight bond around the junction of the conduits.

It is believed to be apparent that appropriate portions of the sheets 1 and 10 may have a sealant or adhesive applied thereto.

While embodiments and applications of this invention have been shown and described, it will be apparent to those skilled in the art that many more modifications are possible without departing from the inventive concepts herein described. The invention, therefore, is not to be restricted except as is necessary by the prior art and by the spirit of the appended claims.

What is claimed as new and desired to be secured by Letters Patent of the United States is:

1. A heat-recoverable article adapted to cover a conduit junction having at least three arms comprising, a sheet member, said sheet member having opposite edge regions capable of being brought and held together to form a radially heat shrinkable tubular member, said sheet member having a heat shrinkable wall portion therein, said wall portion defining an aperture said wall portion being an upstanding peripheral wall extending outwardly from a surface of the sheet member and surrounding said aperture, said upstanding peripheral wall having a height and periphery, which height and periphery, upon heating, reduce to form a further upstanding peripheral wall.

2. The article as in claim 1 including a layer of a sealant means disposed on the surface of said member to be in contact with the conduit being covered.

3. A heat recoverable article adapted to cover a conduit junction having at least three arms comprising, a heat shrinkable sheet member having a first surface and a second surface, said first and second surfaces each having opposite first and second end regions, said first surface including at least two heat shrinkable wall portions therein, each of said wall portions defining an aperture each said wall portion being an upstanding wall extending outwardly from said first surface of the sheet member and surrounding said aperture, each said peripheral upstanding wall having a height and periphery, which height and periphery, upon heating, reduce to form a further upstanding peripheral wall, said first end region of said second surface capable of being brought and attached to said second end region of said first surface thereby forming a tubular radially heat shrinkable member.

4. The article as in claim 3 wherein each aperture is on a line transverse to said first and second opposite end regions of said first and second surfaces.

5. The article as in claim 4 including a contact adhesive disposed on a portion of said second end region of said first surface, said contact adhesive capable of attaching said first end region of said second surface to said second end region of said first surface.

6. The article as in claim 4 including a contact adhesive disposed on said first end region of said second surface, said contact adhesive capable of attaching said second end region of said first surface to said first end region of said second surface.

7. The article as in claim 4 further including a layer of a sealant means disposed on the surface to be in contact with the conduit being covered.

* * * * *